United States Patent
Peterson et al.

(10) Patent No.: US 11,132,306 B2
(45) Date of Patent: Sep. 28, 2021

(54) STALE MESSAGE REMOVAL IN A MULTI-PATH LOCK FACILITY

(71) Applicant: International Business Machines Corporation, Armonk, NY (US)

(72) Inventors: Beth A. Peterson, Tucson, AZ (US); Christopher D. Filachek, Lagrangeville, NY (US); Mark A. Lehrer, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 68 days.

(21) Appl. No.: 16/260,779

(22) Filed: Jan. 29, 2019

(65) Prior Publication Data

US 2020/0242054 A1    Jul. 30, 2020

(51) Int. Cl.
  *G06F 13/16* (2006.01)
  *G06F 9/52* (2006.01)
  *G06F 9/46* (2006.01)

(52) U.S. Cl.
  CPC ............ *G06F 13/161* (2013.01); *G06F 9/467* (2013.01); *G06F 9/526* (2013.01)

(58) Field of Classification Search
  CPC ......... G06F 13/161; G06F 9/467; G06F 9/526
  See application file for complete search history.

(56) References Cited

U.S. PATENT DOCUMENTS

| | | | | |
|---|---|---|---|---|
| 6,247,099 B1 * | 6/2001 | Skazinski | ............ | G06F 12/0815 711/117 |
| 8,060,613 B2 * | 11/2011 | Farber | ..................... | G06F 9/505 709/226 |
| 2004/0111557 A1 * | 6/2004 | Nakatani | ................. | G06F 16/10 711/113 |
| 2006/0020911 A1 * | 1/2006 | Lyons | ..................... | G06F 9/526 717/101 |
| 2014/0172944 A1 * | 6/2014 | Newton | .................. | H04L 67/06 709/202 |
| 2014/0310570 A1 | 10/2014 | Lastras et al. | | |
| 2016/0294604 A1 | 10/2016 | Shakimov et al. | | |
| 2017/0161209 A1 | 6/2017 | Bussa et al. | | |
| 2017/0331804 A1 * | 11/2017 | Jellison, Jr. | ............. | H04L 63/10 |
| 2018/0054474 A1 | 2/2018 | Vlachogiannis et al. | | |
| 2020/0028929 A1 * | 1/2020 | Xavier | .................... | H04L 43/10 |

OTHER PUBLICATIONS

IBM Enterprise Storage Server, "System/390 Command Reference 2105 Models E10, E20, F10, and F20," Jun. 2000 (Year: 2000).*
Merriam-Webster, definition of "message", https://www.merriam-webster.com/dictionary/message (Year: 2020).*

* cited by examiner

*Primary Examiner* — Michael Krofcheck
(74) *Attorney, Agent, or Firm* — Nelson IP; Daniel P. Nelson

(57) ABSTRACT

A method for removing stale messages from a storage controller is disclosed. In one embodiment, such a method includes querying, by a host system, a storage controller to determine ownership of a lock on the storage controller. The host system receives, in response to the query, information indicating that the lock has been granted to the host system. This allows the host system to treat the lock as being granted even though the host system has not received a "lock granted" message from the storage controller. Before using the lock, the host system sends, to the storage controller, an instruction to clear any stale messages on the storage controller related to the lock. A corresponding system and computer program product are also disclosed.

20 Claims, 7 Drawing Sheets

STALE MESSAGE REMOVAL IN A MULTI-PATH LOCK FACILITY

BACKGROUND

Field of the Invention

This invention relates to systems and methods for removing stale messages in storage controllers utilizing a multi-path lock facility.

Background of the Invention

A Multi-Path Lock Facility (MPLF) provides functionality to control processes and share data in a loosely coupled environment. MPLF controls locking through a set of channel commands implemented by DASD storage subsystems. These commands result in settings that indicate a requested operation is either compatible or incompatible with a current state of a lock. The storage controller maintains the names and status of locks in use and responds to requests to obtain or release locks. The storage controller also notifies host systems when it grants lock ownership that was previously denied. A host system may obtain a lock, release a lock, examine the status of an active lock, and check the outcome of lock-related operations using the above-described channel commands.

MPLF may be used by a host system running the IBM® z/Transaction Processing Facility (z/TPF) operating system, or any host system that performs Extended Count Key Data (ECKD) operations, to lock and control access to data (e.g., particular volumes, tracks, or records). Using MPLF, a z/TPF host system may be configured to access a partition (i.e., a bucket for locks) on the storage subsystem via a particular path (i.e., connection path) for a particular volume (i.e., connection volume). The connection path provides means for the storage controller to notify the z/TPF host system that it has been granted a lock.

When a connection path between a storage controller and z/TPF host system is broken, the storage controller may be unable to send messages to the host system, such as those indicating that a lock has been granted. When no message is received by the host system, z/TPF may invoke a Missing Attention Handler (MAH) after a timeout period has elapsed. MAH may query the storage system for lock ownership with respect to a partition and, in the event MAH sees the lock is granted, treat the lock as granted without receiving a normal "lock granted" message from the storage controller. In such cases, the z/TPF host system may behave as if it owns the lock and perform desired read/write activity to the partition.

When a connection path between a z/TPF host system and storage controller is broken, messages, such as the "lock granted" message discussed above, may be orphaned on the storage controller. These messages may remain on the storage controller in a state of limbo until a new connection path is established between the z/TPF host system and the storage controller. Once a new connection path is established, any orphaned messages waiting on the storage controller are typically sent to the z/TPF host system over the connection path.

Unfortunately, by the time the z/TPF host system receives the delayed messages, many of the messages may be stale and may actually do more to confuse the z/TPF host system than to inform it. For example, if a z/TPF host system receives a stale "lock granted" message some time after the z/TPF host system has already used and released the corresponding lock, this may confuse the z/TPF host system and require complex logic on the z/TPF host system to manage and handle the message. This additional logic may negatively impact performance on the z/TPF host system. In worse case scenarios, the stale message may be incorrectly matched with an unrelated action (e.g., lock request) of the z/TPF host system that is contemporaneous in time, possibly causing data corruption and/or logic errors on the z/TPF host system.

In view of the foregoing, what are needed are systems and methods to more effectively handle stale messages that have been orphaned on a storage controller. Ideally, such systems and methods will minimize performance impacts and confusion on a host system.

SUMMARY

The invention has been developed in response to the present state of the art and, in particular, in response to the problems and needs in the art that have not yet been fully solved by currently available systems and methods. Accordingly, systems and methods in accordance with the invention have been developed to remove stale messages from a storage controller. The features and advantages of the invention will become more fully apparent from the following description and appended claims, or may be learned by practice of the invention as set forth hereinafter.

Consistent with the foregoing, a method for removing stale messages from a storage controller is disclosed. In one embodiment, such a method includes querying, by a host system, a storage controller to determine ownership of a lock on the storage controller. The host system receives, in response to the query, information indicating that the lock has been granted to the host system. This allows the host system to treat the lock as being granted even though the host system has not received a "lock granted" message from the storage controller. Before using the lock, the host system sends, to the storage controller, an instruction to clear any stale messages on the storage controller related to the lock.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
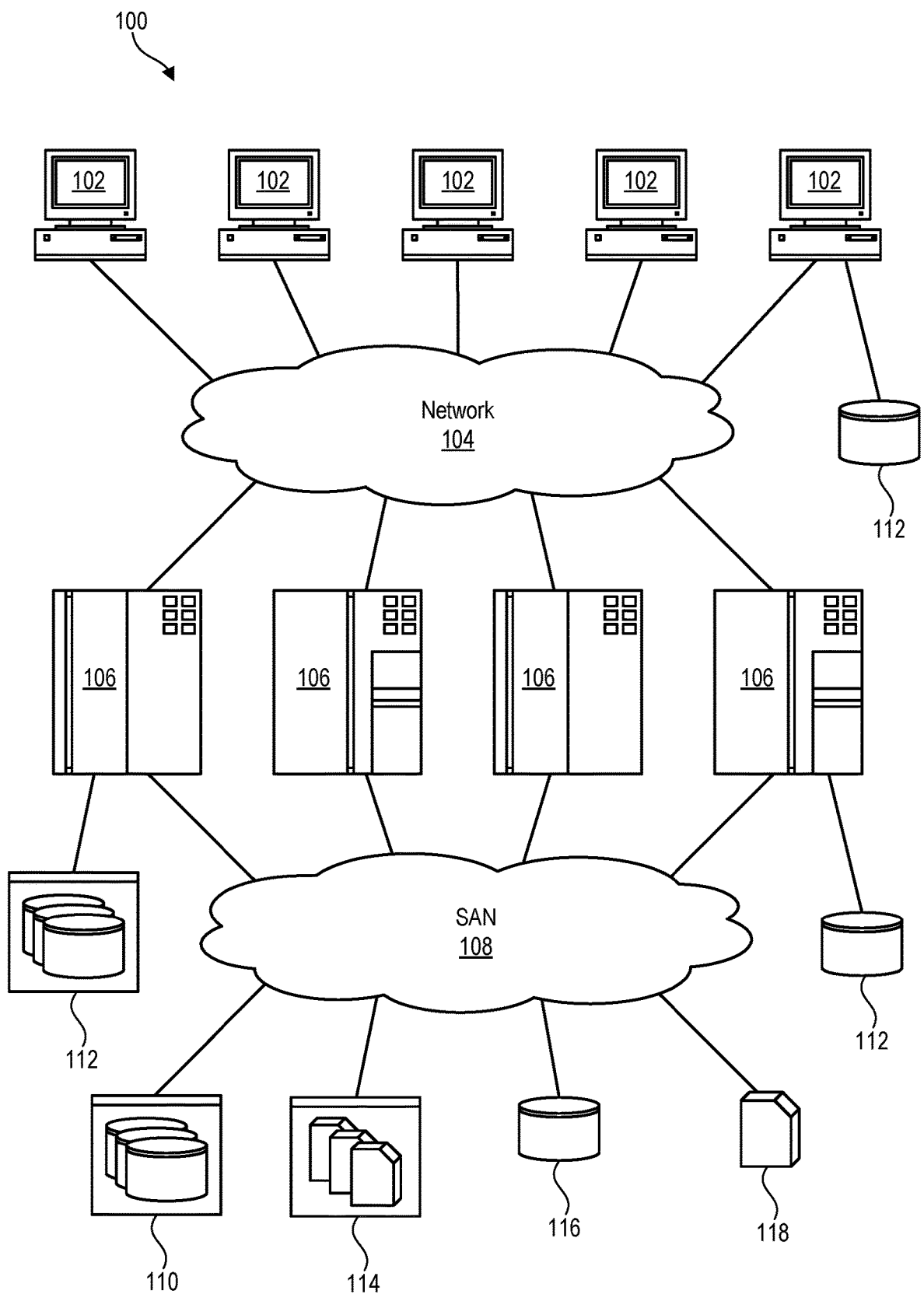
FIG. 1 is a high-level block diagram showing one example of a network environment in which systems and methods in accordance with the invention may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage system, a magnetic storage system, an optical storage system, an electromagnetic storage system, a semiconductor storage system, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage system via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention may be described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where systems and methods in accordance with the invention may be implemented. The network environment 100 is presented by way of example and not limitation. Indeed, the systems and methods disclosed herein may be applicable to a wide variety of different network environments in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for and respond to requests from the client computers 102. In certain embodiments, the computers 102 and/or servers 106 may connect to one or more internal or external direct-attached storage systems 112 (e.g., arrays of hard-storage drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems, such as arrays 110 of hard-disk drives or solid-state drives, tape libraries 114, individual hard-disk drives 116 or solid-state drives 116, tape drives 118, CD-ROM libraries, or the like. To access a storage system 110, 114, 116, 118, a host system 106 may communicate over physical connections from one or more ports on the host 106 to one or more ports on the storage system 110, 114, 116, 118. A connection may be through a switch, fabric, direct connection, or the like. In certain embodiments, the servers 106 and storage systems 110, 114, 116, 118 may communicate using a networking standard such as Fibre Channel (FC) or iSCSI.

Figure 2:
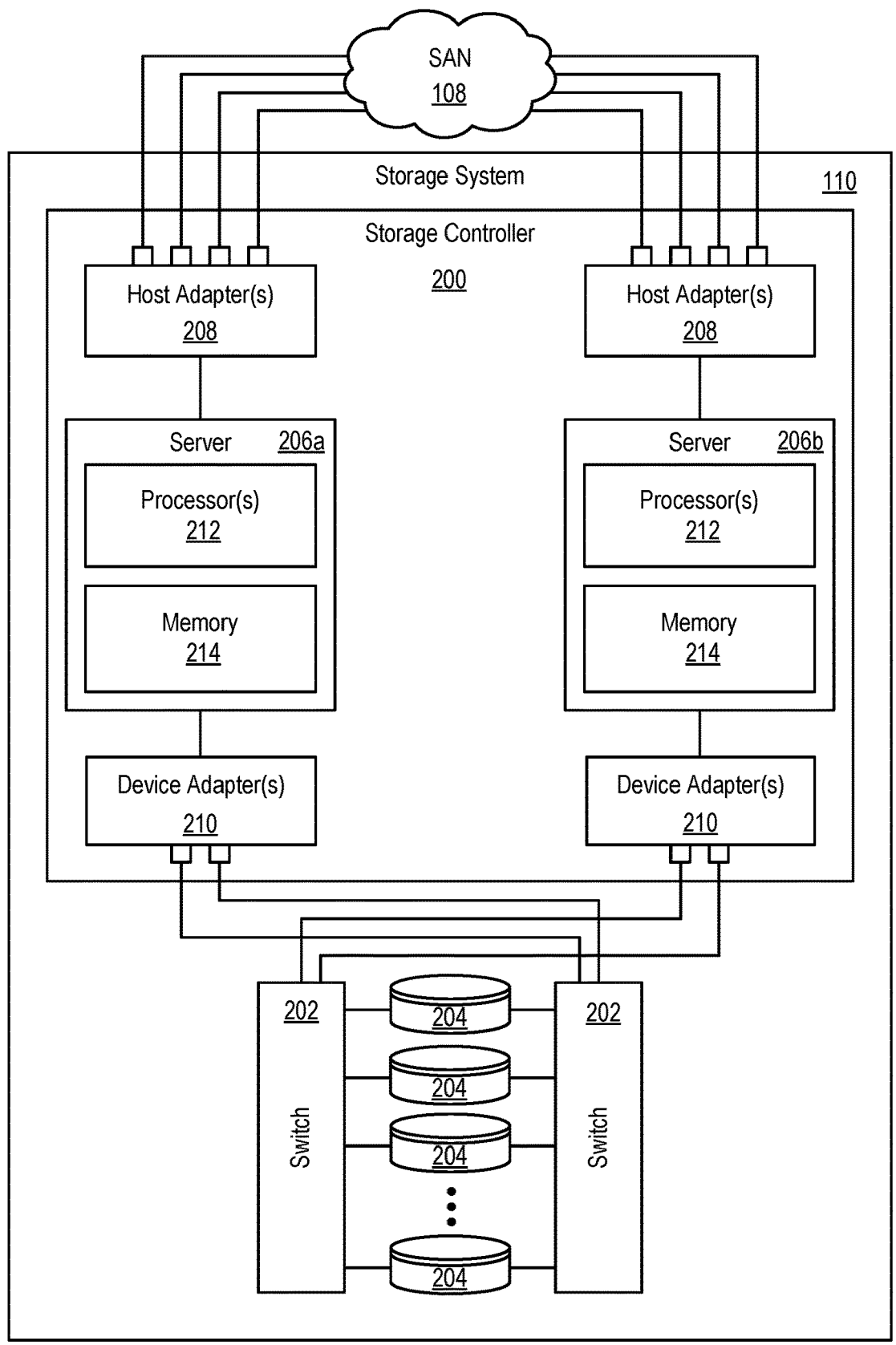
FIG. 2 is a high-level block diagram showing one embodiment of a storage system for use in the network environment of FIG. 1.

Referring to FIG. 2, one example of a storage system 110 containing an array of hard-disk drives 204 and/or solid-state drives 204 is illustrated. The internal components of the storage system 110 are shown since the data compression techniques disclosed herein may, in certain embodiments, be implemented within such a storage system 110. As shown, the storage system 110 includes a storage controller 200, one or more switches 202, and one or more storage drives 204, such as hard-disk drives 204 and/or solid-state drives 204 (e.g., flash-memory-based drives 204). The storage controller 200 may enable one or more hosts 106 (e.g., open system and/or mainframe servers 106 running operating systems such z/OS, zVM, or the like) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. The servers 206 may host at least one instance of these software modules. These software modules may manage all read and write requests to logical volumes in the storage drives 204.

One example of a storage system 110 having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the techniques disclosed herein are not limited to the IBM DS8000™ enterprise storage system 110, but may be implemented in any comparable or analogous storage system 110, regardless of the manufacturer, product name, or components or component names associated with the system 110. Any storage system that could benefit from one or more embodiments of the invention is deemed to fall within the scope of the invention. Thus, the IBM DS8000™ is presented only by way of example and not limitation.

Figure 3:
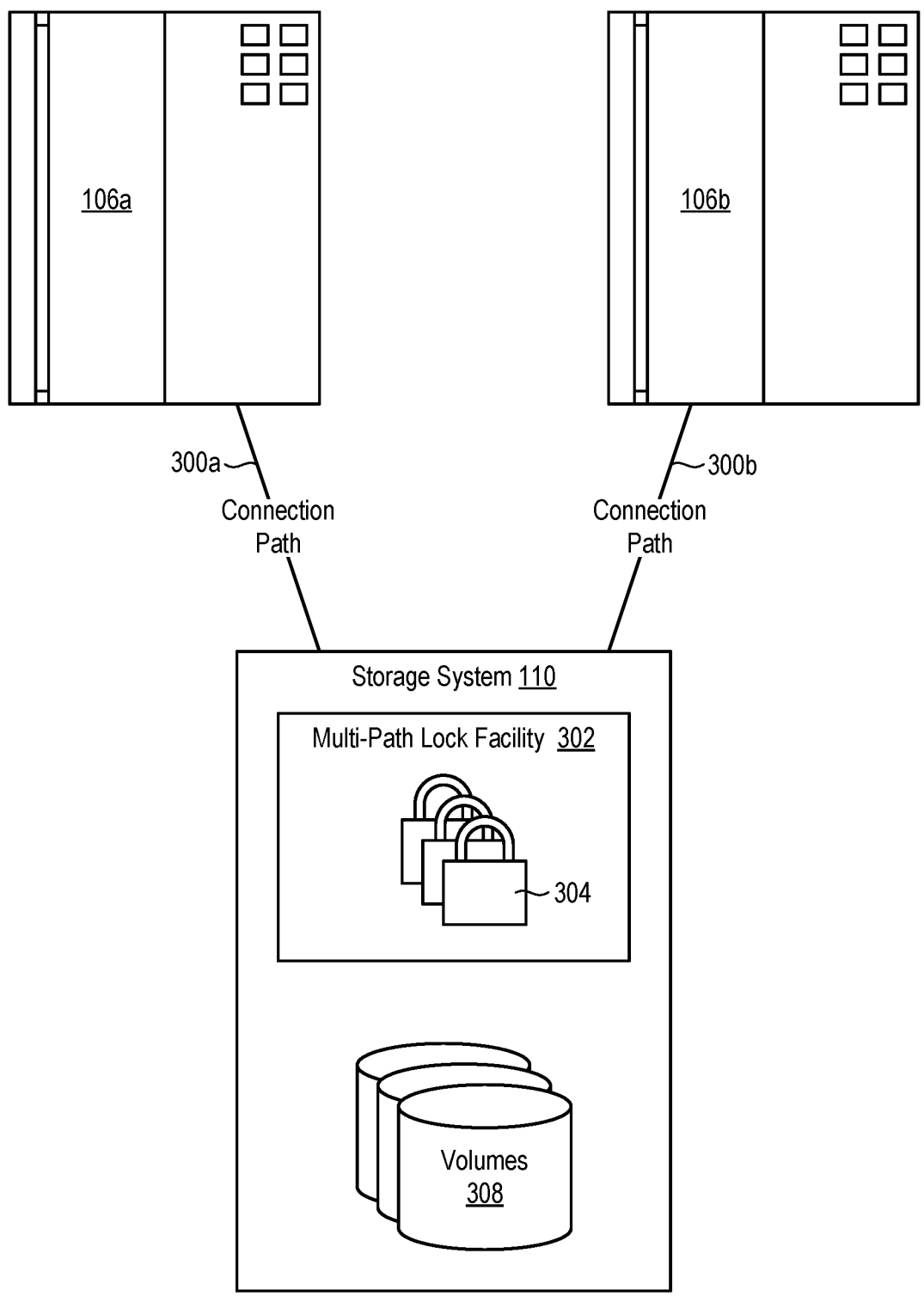
FIG. 3 shows a multi-path lock facility used to coordinate shared access to data on a storage system.

Referring to FIG. 3, in certain embodiments, a multi-path lock facility 302 implemented on a storage system 110 provides functionality to control processes and share data in a loosely coupled environment where multiple host systems 106a, 106b share data on the same storage system 110. The multi-path lock facility 302 may control locking through a set of channel commands implemented by the storage system 110. These commands may result in settings that indicate that a requested operation is either compatible or incompatible with a current state of a lock 304. The storage controller 200 may maintain names and status of locks 304 in use and respond to requests to obtain or release locks 304. The storage controller 200 also notifies host systems 106 when it grants lock ownership that was previously denied. A host system 106 may obtain a lock 304, release a lock 304, examine the status of an active lock 304, and check the outcome of lock-related operations using the above-described channel commands.

In certain embodiments, the multi-path lock facility 302 may be used by a host system 106 running the IBM® z/Transaction Processing Facility (z/TPF) operating system to lock and serialize access to data (e.g., particular volumes 308, tracks, records, etc.). This ensures that only one host system 106 can update data at a time. Using the multi-path lock facility 302, a z/TPF host system 106 may be configured to access a partition (i.e., a bucket for locks) on the storage system 110 via a particular path 300 (i.e., connection path 300) for a particular volume 308 (i.e., connection volume 308). The connection path 300 provides means for the storage controller 200 to notify the z/TPF host system 106 that it has been granted a lock 304.

Figure 4:
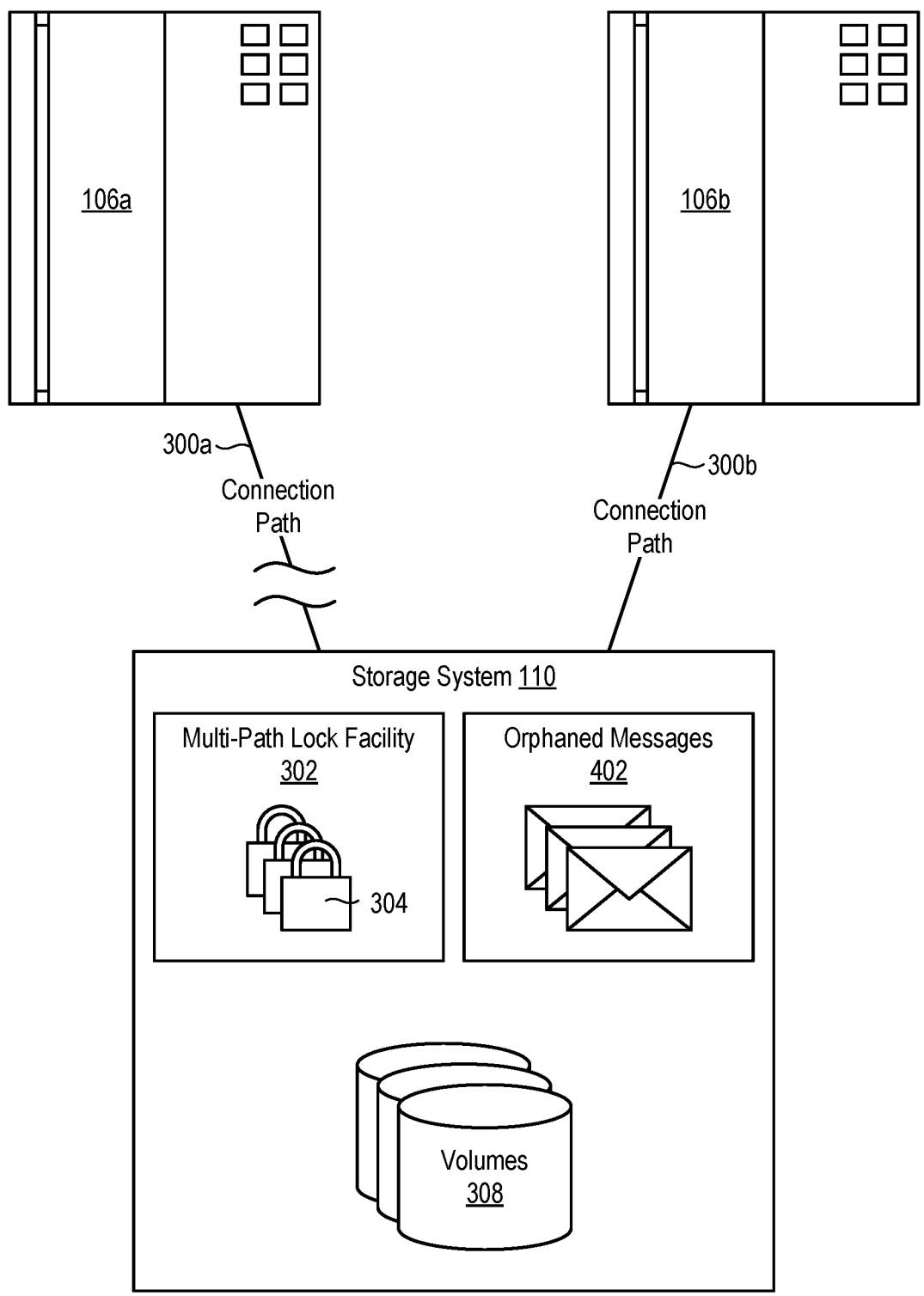
FIG. 4 shows a broken connection path between a host system and a storage system, as well as resulting orphaned messages on the storage system.
Figure 5:
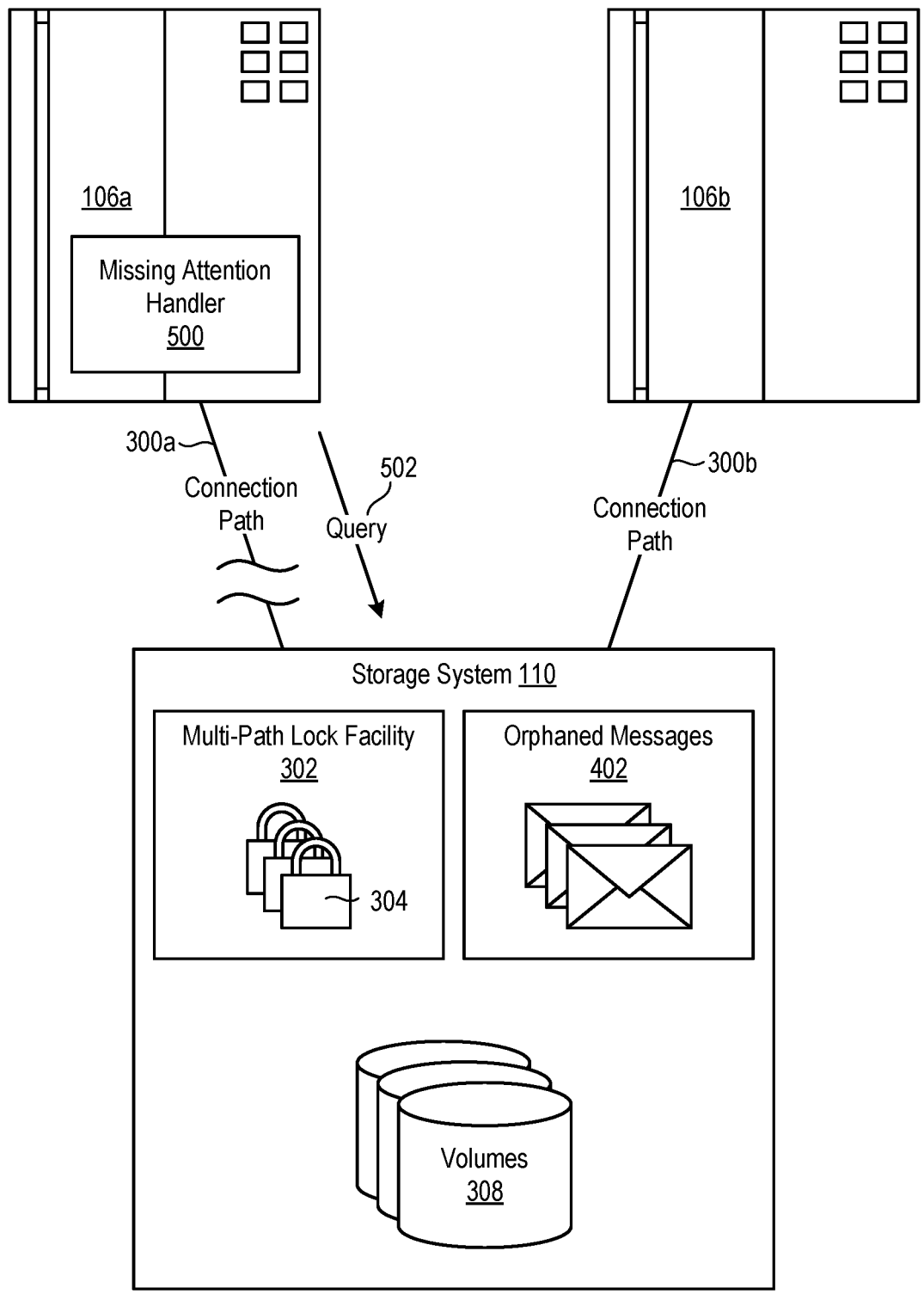
FIG. 5 shows a missing attention handler used to transmit a query from a host system to a storage system to determine lock ownership.

Referring to FIG. 4, when a connection path 300a between a storage controller 200 and a z/TPF host system 106a is broken, the storage controller 200 may be unable to send messages to the host system 106a, such as those indicating that a lock 304 has been granted to the host system 106a. When no message is received by the host system 106a, z/TPF may invoke a missing attention handler 500 after a timeout period has elapsed, as shown in FIG. 5. This missing attention handler 500 may transmit a query 502 to the storage system 110 (over paths other than the broken connection path 300a) to determine lock ownership with respect to a partition. In the event the missing attention handler 500 receives information that the lock 304 has been granted, the host system 106 may treat the lock 304 as granted without receiving a normal "lock granted" message from the storage controller 200. In such cases, the z/TPF host system 106 may behave as if it owns the lock 304 and perform any desired read/write activity.

Figure 6:
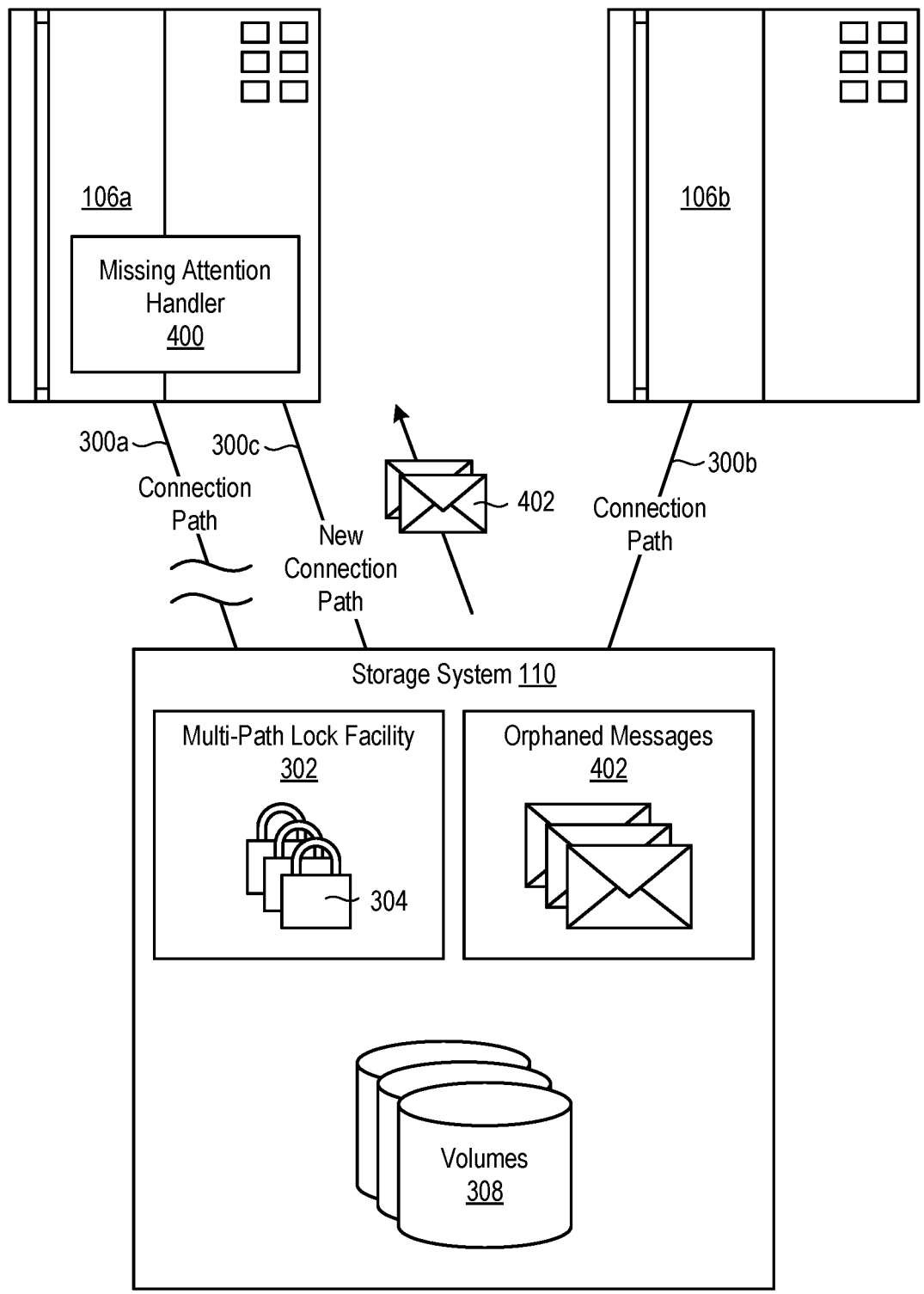
FIG. 6 shows transmission of orphaned messages from a storage system to a host system once a new connection path is established therebetween.

Referring again to FIG. 5, when a connection path 300a between a z/TPF host system 106a and storage controller 200 is broken, messages 402, such as the "lock granted" message 402 discussed above, may be orphaned on the storage controller 200. These messages 402 may remain on the storage controller 200 in a state of limbo until a new connection path 300c is established between the z/TPF host system 106a and the storage controller 200. Once a new connection path 300c is established, as shown in FIG. 6, any orphaned messages 402 waiting on the storage controller 200 may be sent to the z/TPF host system 106a over the newly established connection path 300c. In certain embodiments, establishing a new connection path 300c may require issuing, by the host system 106, various commands to the storage system 110 (and more particularly to the storage controller 200) to establish the new connection path 300c.

Unfortunately, by the time the z/TPF host system 106a receives the delayed messages 402, many of the messages 402 may be stale and may actually do more to confuse the z/TPF host system 106a than to inform it. For example, if a z/TPF host system 106a receives a stale lock granted message 402 some time after the z/TPF host system 106a has already used and released the corresponding lock 304, this may confuse the z/TPF host system 106a and require complex logic on the z/TPF host system 106a to manage and handle the message 402. This additional logic may negatively impact performance on the z/TPF host system 106a. In worse case scenarios, the stale message 402 may be incorrectly matched with an unrelated action (e.g., a lock request) of the z/TPF host system 106a that is contemporaneous in time, possibly incurring data corruption on the storage system 110 and/or logic errors on the z/TPF host system 106.

Thus, systems and methods are needed to more effectively handle stale messages 402 that are orphaned on a storage controller 200 and possibly transmitted to a host system 106. Ideally, such systems and methods will minimize performance impacts and confusion on the host system 106.

Figure 7:
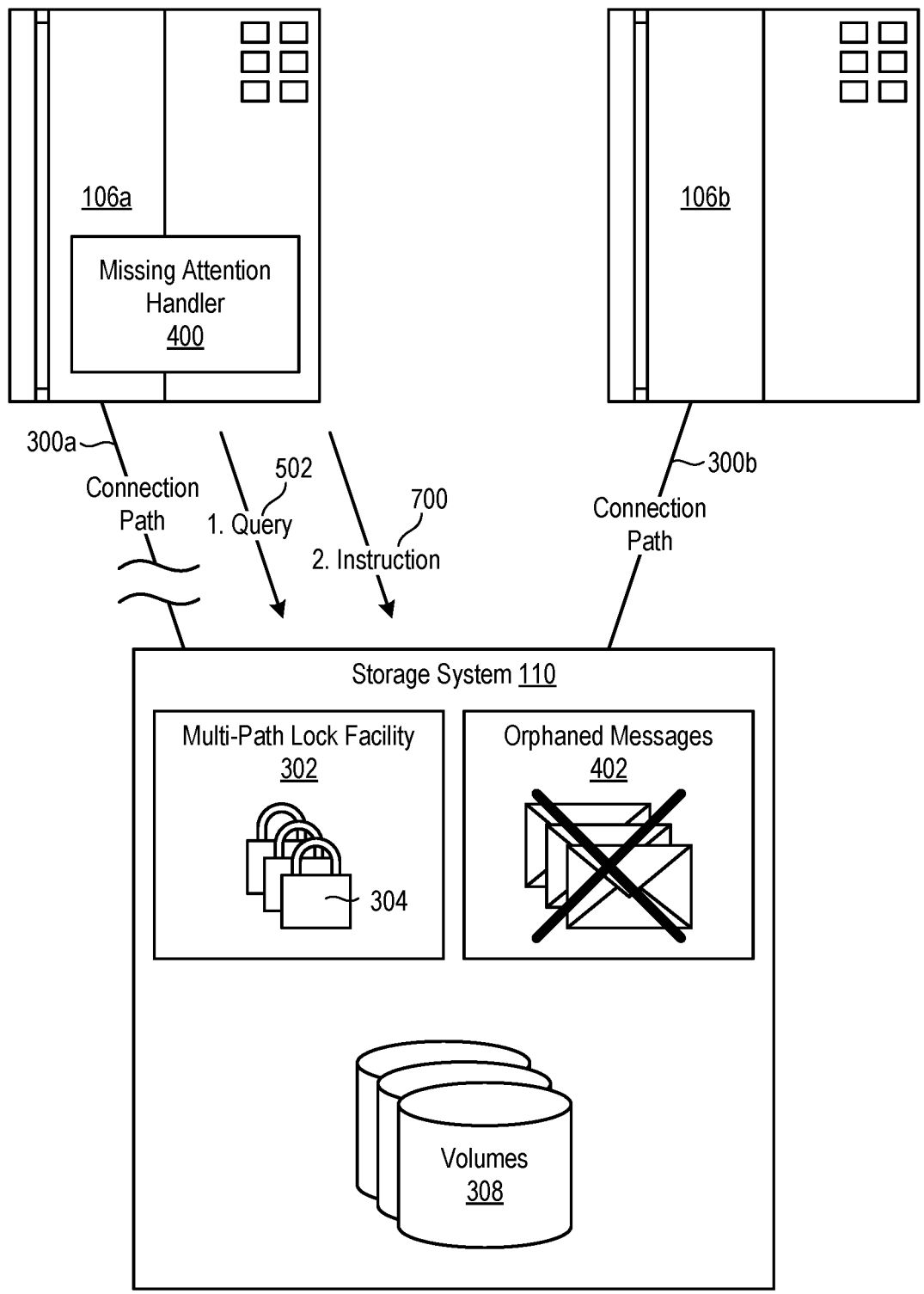
FIG. 7 shows transmission of a new instruction from a host system to a storage system to clear orphaned messages on the storage system.

Referring to FIG. 7, in certain embodiments in accordance with the invention, a new instruction 700 (e.g., a Remove Partition Messages command) may be established to enable stale and/or orphaned messages 402 to be cleared on a storage system 110. Thus, in a scenario where a connection path 300a breaks, the missing attention handler 500 may query the storage system 110 to determine the status of a lock 304. In the event the missing attention handler 500 determines that the lock 304 is granted, the host system 106 may treat the lock 304 as granted without receiving a normal "lock granted" message from the storage controller 200. Before performing actions (e.g., reads, writes, etc.) under the assumed lock 304, the host system 106a and more particularly the missing attention handler 500 may issue the new instruction 700 to the storage system 110 to clear any stale and/or orphaned messages 402 associated with the lock 304. This will ensure that these stale and/or orphaned messages 402 will not be transmitted to the host system 106a at a later time to possibly confuse the host system 106a, require execution of additional logic on the host system 106a, and/or compromise data integrity.

In certain embodiments, the new instruction 700 may include parameters, such as a partition number or other identifier, logical subsystem identifier, and information identifying a user of the partition (e.g., host system 106 controlling access to the partition). The parameters may also, in certain embodiments, include information regarding the granularity of lock removal for the partition or user. For example, the new instruction 700 may indicate that orphaned messages 402 are to be cleared for a single lock 304, a list of locks 304, all locks 304, or the like, associated with a user or partition. The new instruction 700 may also, in certain embodiments, not be tied to any particular (prior or current) connection path 300 since the reason the messages 402 were orphaned in the first place was the loss of an associated connection path 300.

In certain embodiments, the query 502 (e.g., a Read Partition Data query 502) may also be enhanced to provide additional connection information for a partition (e.g., associated path group identifier (SPID), disk subsystem identifier (SSID), volume identifier, etc.). This additional information may be helpful to the missing attention handler 500 to determine whether to issue the new instruction 700 to the storage system 110, as well as how parameters should be set in the new instruction 700.

The flowcharts and/or block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for removing stale messages from a storage controller, the method comprising:
   querying, by a host system, a storage controller to determine ownership of a lock for a particular partition on the storage controller;
   receiving, by the host system in response to the query, information indicating that the lock has been granted to the host system for the partition;
   treating, by the host system, the lock as being granted to the host system notwithstanding the host system not receiving a "lock granted" message from the storage controller; and
   sending, from the host system to the storage controller, a special instruction specifically configured to clear any stale "lock granted" messages on the storage controller, wherein the stale "lock granted" messages are "lock granted" messages that are currently waiting on the storage controller but were not timely delivered to the host system, and wherein the special instruction includes a lock granularity parameter that indicates whether "lock granted" messages should be cleared for either a single lock or multiple locks associated with the partition.

2. The method of claim 1, wherein querying by the host system comprises querying by a missing attention handler on the host system.

3. The method of claim 1, wherein the special instruction references an identifier associated with the partition.

4. The method of claim 1, wherein the special instruction identifies the host system.

5. The method of claim 1, wherein the stale "lock granted" messages are "lock granted" messages that are orphaned on the storage controller.

6. The method of claim 5, wherein the stale "lock granted" messages are orphaned on the storage controller as a result of a broken connection path between the storage controller and the host system.

7. The method of claim 1, wherein querying by the host system comprises querying by the host system after not receiving a "lock granted" message for a specified period of time.

8. A computer program product for removing stale messages from a storage controller, the computer program product comprising a non-transitory computer-readable storage medium having computer-usable program code embodied therein, the computer-usable program code configured to perform the following when executed by at least one processor:

query, by a host system, a storage controller to determine ownership of a lock for a particular partition on the storage controller;

receive, by the host system in response to the query, information indicating that the lock has been granted to the host system for the partition;

treat, by the host system, the lock as being granted to the host system notwithstanding the host system not receiving a "lock granted" message from the storage controller; and send, from the host system to the storage controller, a special instruction specifically configured to clear any stale "lock granted" messages on the storage controller, wherein the stale "lock granted" messages are "lock granted" messages that are currently waiting on the storage controller but were not timely delivered to the host system, and wherein the special instruction includes a lock granularity parameter that indicates whether "lock granted" messages should be cleared for either a single lock or multiple locks associated with the partition.

9. The computer program product of claim 8, wherein querying by the host system comprises querying by a missing attention handler on the host system.

10. The computer program product of claim 8, wherein the special instruction references an identifier associated with the partition.

11. The computer program product of claim 8, wherein the special instruction identifies the host system.

12. The computer program product of claim 8, wherein the stale "lock granted" messages are "lock granted" messages that are orphaned on the storage controller.

13. The computer program product of claim 12, wherein the stale "lock granted" messages are orphaned on the storage controller as a result of a broken connection path between the storage controller and the host system.

14. The computer program product of claim 8, wherein querying by the host system comprises querying by the host system after not receiving a "lock granted" message for a specified period of time.

15. A system for removing stale messages from a storage controller, the system comprising:

a host system comprising at least one processor; and at least one memory device coupled to the at least one processor and storing instructions for execution on the at least one processor, the instructions causing the at least one processor to:

query a storage controller to determine ownership of a lock for a particular partition on the storage controller;

receive, in response to the query, information indicating that the lock has been granted to the host system for the partition;

treat the lock as being granted to the host system notwithstanding the host system not receiving a "lock granted" message from the storage controller; and send, to the storage controller, a special instruction specifically configured to clear any stale "lock granted" messages on the storage controller, wherein the stale "lock granted" messages are "lock granted" messages that are currently waiting on the storage controller but were not timely delivered to the host system, and wherein the special instruction includes a lock granularity parameter that indicates whether "lock granted" messages should be cleared for either a single lock or multiple locks associated with the partition.

16. The system of claim 15, wherein querying comprises querying by a missing attention handler on the host system.

17. The system of claim 15, wherein the special instruction references an identifier associated with the partition.

18. The system of claim 15, wherein the special instruction identifies the host system.

19. The system of claim 15, wherein the stale "lock granted" messages are "lock granted" messages that are orphaned on the storage controller.

20. The system of claim 15, wherein querying comprises querying after not receiving a "lock granted" message for a specified period of time.

* * * * *